A. H. HUNT.
FISHING REEL.
APPLICATION FILED NOV. 25, 1916.
1,296,395.
Patented Mar. 4, 1919.
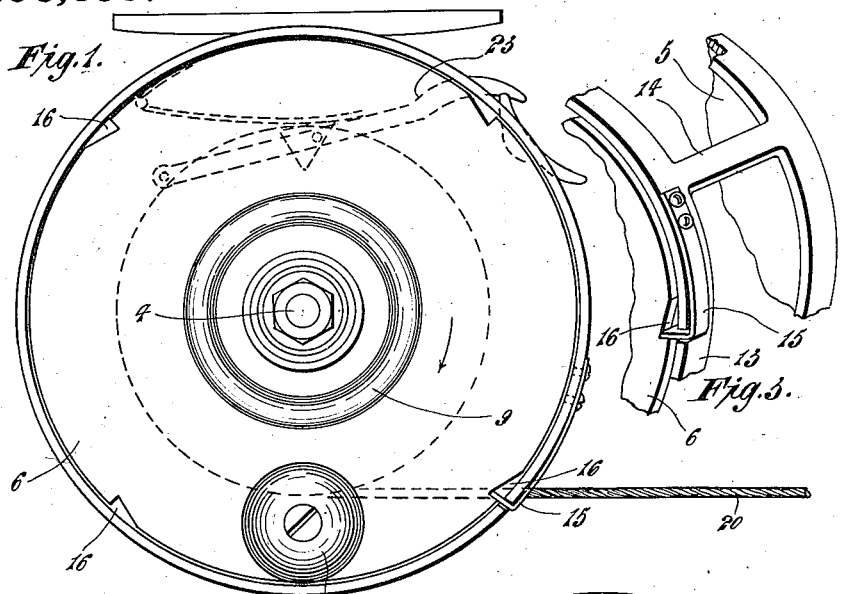
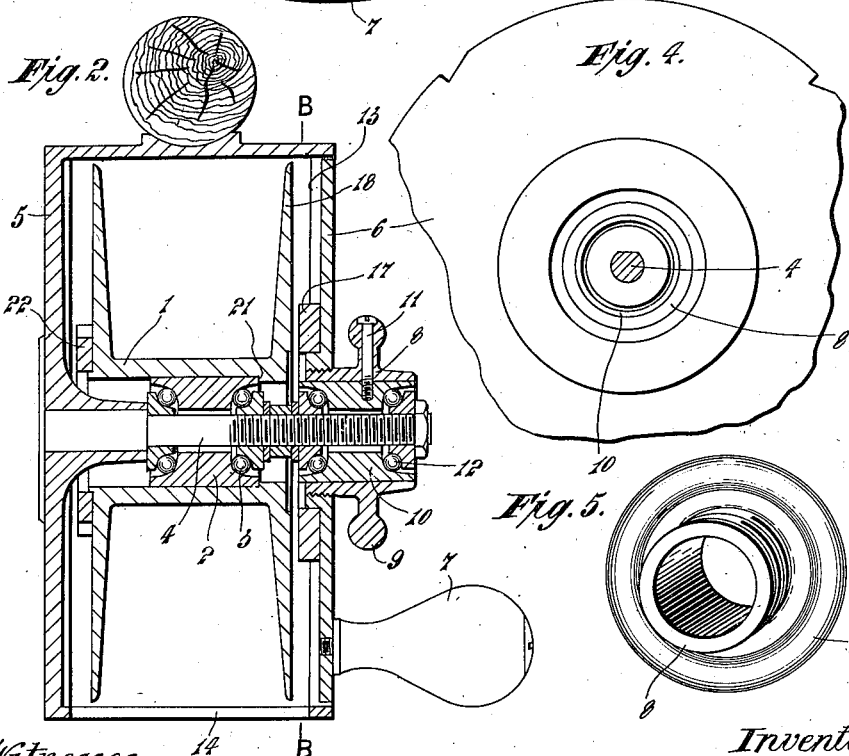
Witnesses.
Inventor.
Albert Henry Hunt.
Attorney.

UNITED STATES PATENT OFFICE.

ALBERT H. HUNT, OF WELLINGTON, NEW ZEALAND.

FISHING-REEL.

1,296,395.　　　　Specification of Letters Patent.　　　Patented Mar. 4, 1919.

Application filed November 25, 1916. Serial No. 133,377.

*To all whom it may concern:*

Be it known that I, ALBERT HENRY HUNT, of 117 Karori road, in the city of Wellington, New Zealand, a subject of the King of Great Britain and Ireland, residing at Wellington, have invented a new and useful Improvement in Fishing-Reels; and I do hereby declare the following to be a full, clear, and exact description of the same.

This invention relates to fishing reels of the type in which the tension upon the spool can be regulated by means of a friction disk or contact between the spool and a relatively adjustable part of the reel casing.

The object of the present invention is to provide a reel wherein the unwinding of the spool may be controlled in degrees varying from a free wheel to an almost tight lock by a brake action with the unwinding means which brake action does not interfere with the operation of winding and does not cause the winding means to rotate when the spool is being rotated by the pull of the fish.

In the present invention the winding means is adapted to rotate only in the direction of winding. The spool is controlled by a friction clutch or contact located between the spool and the winding means, the friction between the reel and the winding means being adjustable in order to obtain the desired amount of tension and control. The adjustment of the contact is obtained by an adjusting device coöperating with the winding means. A pawl or the like checking device is provided to prevent the winding means from being rotated in the reverse direction under the tension of the pull of the fish. Both the reel and the adjusting device are preferably mounted upon ball bearings.

The invention will now be described with the aid of the accompanying drawings wherein:—

Figure 1 is a side elevation of a reel.

Fig. 2 is a cross section.

Fig. 3 is a perspective view of the pawl upon the casing.

Fig. 4 is an elevation of the winding disk and frictional contact shown in Fig. 2.

Fig. 5 is a perspective view of the adjusting wheel.

The spool 1 is mounted on a sleeve 2 journaled in ball bearings 3 located upon a spindle 4 fixed to one side 5 of the reel casing (see Fig. 2).

A disk 6 provided with an operating handle 7 corresponds or approximates in diameter to the flanges of the spool 1 and is threaded upon the annular portion of an adjusting wheel 8 provided with an integral operating rim 9. This wheel 8 is mounted upon a sleeve 10 and adapted to be secured thereto by screws 11 while the sleeve itself is rotatably mounted upon ball bearings 12 arranged upon the spindle 4.

The reel casing has a circumferential flange 13 united to the side 5 by webs 14 while a spring operated pawl 15 (see Figs. 1 and 3) is fixed to the flange 13 and normally engages notches 16 in the disk 6.

The pawl 15 is adapted to prevent the reverse motion of the winding disk thus preventing the rotation of the handle when the line is being run out under tension of the pull of the fish.

An annular ring 17 of leather or other suitable material is interposed between the disk 6 and a flange 18 of the spool and forms the frictional contact between the winding means and the spool. This ring may be loosely interposed between the disk and the flange but is preferably fixed to the disk. The disk 6 being threaded upon the adjusting wheel 8 lateral movement thereof is obtained by the rotation of the adjusting wheel 8.

In operation when the line 20 is run out under tension of the pull of the fish the spool is free to rotate except so far as it is controlled by the frictional contact, the operating disk 6 remaining stationary. When it is desired to free the spool for casting or similar purposes the wheel 8 is rotated in the direction of the arrow in Fig. 1, thereby causing the disk 6 to travel outwardly upon the thread on the annular portion of the wheel 8 thus causing the friction ring 17 to move out of contact with the flange 18 thus freeing the spool.

Immediately it is required to increase the resistance of the spool as against the pull of the fish the adjusting wheel 8 is rotated in a direction opposite to that indicated by the arrow in Fig. 1 thereby causing the disk 6 to move toward the flange 18 and exert pressure thereon thus creating a brake action which retards the freedom of the spool and which may be exerted to the desired degree by the operator.

It will be clearly seen that the tension upon the spool may be controlled in varying degrees simply by operating the wheel 8 thus allowing the fish to have either free movement, or resistance may be given to the fish by retarding the freedom of the spool, or any further unwinding of the line may be prevented by locking the winding means with the spool simply by increasing the tension for the purpose of winding in the line or for landing the fish.

The spool is adapted to pass over and fit snugly upon the sleeve 2 and is provided with a shoulder 21 for determining the correct position of the spool upon the sleeve. The internal diameter of the barrel of the spool at the shoulder 21 is slightly greater than the external diameter of the sleeve 10 in order to allow the spool to be removed without interfering with the sleeve. Thus by removing the adjusting wheel 8 from the sleeve 10 the spool may be removed and a fresh spool substituted without in any way altering the adjustment of the reel.

A toothed wheel 22 is fixed to the spool within which the usual check mechanism 23 engages (see Figs. 1 and 2).

What I claim is:—

1. In a fishing reel, a casing, an axle within said casing, a spool revolubly mounted within said casing, winding means revolubly mounted on said axle, friction means between said winding means and the said spool, adjusting means revolubly mounted on the said axle, said winding means laterally adjustable upon said adjusting means, said adjusting means rotatable independently of said winding means, and means whereby said winding means are prevented from rotating in the direction opposite to that employed for winding.

2. In a fishing reel, a casing, an axle within said casing, a spool revolubly mounted on said axle, an adjusting wheel revolubly mounted on said axle, a winding disk threaded upon the outer circumference of said adjusting wheel, friction means between said winding disk and the said spool, means whereby upon the rotation of the adjusting wheel the winding disk will move laterally thereon in order to obtain the desired friction between said winding disk and the spool.

3. In a fishing reel, a casing, a circumferential flange on said casing, an axle within said casing, a spool revolubly mounted on said axle, an adjusting wheel revolubly mounted upon said axle, a winding disk mounted upon said adjusting wheel and having lateral movement thereon, friction means between the said disk and the said spool, notches in the circumference of said winding disk, a spring operated pawl on said circumferential flange and engaging the said notches in order that the winding disk can only be rotated for the purpose of winding in the line.

4. In a fishing reel, a casing, an axle within said casing, a sleeve revolubly mounted on said axle, a spool mounted upon said sleeve, a second sleeve revolubly mounted upon said axle and over which second sleeve said spool is adapted to pass, an adjusting wheel mounted on said second sleeve, a winding disk threaded upon said adjusting wheel, frictional contact between said winding disk and said spool, and means whereby said winding disk is prevented from rotating when the spool is being rotated in the reverse direction.

5. In a fishing reel, a casing, an axle within said casing, a sleeve rotatably mounted upon ball bearings upon said axle, a spool mounted upon said sleeve, a shoulder upon the internal circumference of said spool whereby the position of said spool upon the said sleeve is determined, a second sleeve rotatably mounted on ball bearngs upon said axle, an adjusting wheel mounted on said sleeve, a winding disk threaded on said adjusting wheel, a friction contact between said winding disk and said spool, and means whereby said winding disk is prevented from rotating in the reverse direction to that of winding.

6. In a fishing reel, a casing, a circumferential flange thereon, a spool revolubly mounted within the casing, a winding disk carried by the reel and having circumferential notches, means for applying a frictional connection between the disk and the spool, and a pawl on the aforesaid flange and engaging the said notches in order that the winding disk can only be rotated for the purpose of winding in the line.

7. In a fishing reel, a casing, an axle within the casing, a spool revoluble around the axle, a sleeve revolubly mounted upon the axle and over which said spool is adapted to pass, an adjusting wheel mounted on the sleeve, a winding disk threaded upon the adjusting wheel, frictional contact means between the winding disk and the spool, and means whereby said winding disk is prevented from rotating when the spool is being rotated in the reverse direction.

8. In a fishing reel, a casing, a spool revolubly mounted within the casing, an adjusting device carried by the reel, a winding disk movably mounted upon the adjusting device, frictional contact means between the winding disk and the spool, means for varying said frictional contact, and means whereby said winding disk is prevented from rotating when the spool is being rotated in the reverse direction.

9. In a fishing reel, a casing, an axle within said casing, a spool revolubly mounted on said axle, a freely revoluble member on said axle, winding means mounted on said member, friction means between said winding means and said spool, means whereby upon turning said member the friction between the winding means and said spool may be increased or decreased, and means whereby said winding means are prevented from rotating in the direction opposite to that employed for winding.

10. In a fishing reel, a casing, an axle within said casing, a spool revolubly mounted on said axle, a freely revoluble member on said axle, winding means mounted on said member revoluble therewith, friction means between said winding means and said spool, means whereby said winding means can be moved laterally in relation to said member by rotating said member in order to increase or decrease the friction between the winding means and the said spool, and means whereby said winding means are prevented from rotating in the direction opposite to that employed for winding.

11. In a fishing reel, a casing, an axle within said casing, a spool revolubly mounted on said axle, an adjusting device revolubly mounted on said axle, a winding disk mounted on said adjusting device and revoluble therewith, a friction contact between said winding disk and said spool, said winding disk adjustable laterally when said adjusting device is turned independently thereof, and means whereby the said winding disk is adapted to only rotate in one direction.

In testimony whereof I have signed my name to this specification in the presence of two subscribing witnesses.

A. H. HUNT.

Witnesses:
SYDNEY H. HIGGS,
NORA MUIR.